United States Patent [19]

Yoshizaki

[11] Patent Number: 4,464,698

[45] Date of Patent: Aug. 7, 1984

[54] PROTECTIVE RELAY

[75] Inventor: Atsuhiro Yoshizaki, Katsuta, Japan

[73] Assignee: Hitachi, Ltd., Tokyo, Japan

[21] Appl. No.: 420,300

[22] Filed: Sep. 20, 1982

[51] Int. Cl.³ .............................................. H02H 3/38
[52] U.S. Cl. ..................................... 361/79; 364/483
[58] Field of Search ...................... 361/79, 80, 82, 84, 361/85, 93; 364/480, 483

[56] References Cited

U.S. PATENT DOCUMENTS

| 3,885,199 | 5/1975 | Nohara et al. | 361/79 |
| 4,377,833 | 3/1983 | Udren | 361/79 |
| 4,420,805 | 12/1983 | Yamaura et al. | 361/79 X |

OTHER PUBLICATIONS

"Microprocessor Based Digital Relays Application in TEPCO"—Yamaura et al. IEEE Transactions on Power Apparatus and Systems, vol. PAS-100 No. 5, 5/81.

Primary Examiner—Harry E. Moose, Jr.
Attorney, Agent, or Firm—Antonelli, Terry & Wands

[57] ABSTRACT

A protective relay which carries out various relay functions by converting externally received AC data into time widths in accordance with protective ranges and determining whether or not the protective operations are necessary on the basis of the time widths. The protective relay receives a plurality of input AC data through a time-dividing device and converts the time-divided data into the time widths for the relay functions to determine the relay operations of the relay functions on the basis of the time widths.

9 Claims, 25 Drawing Figures

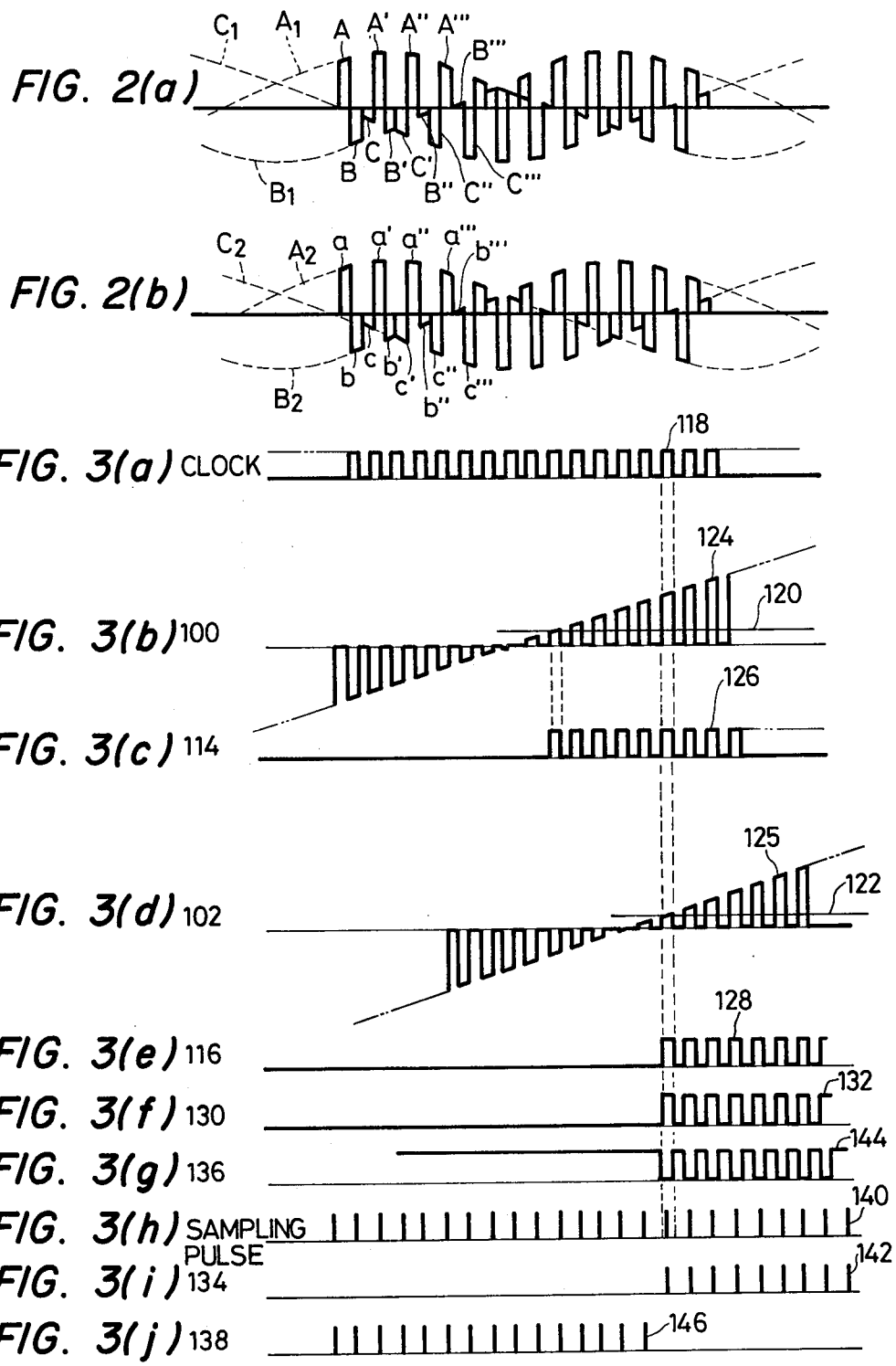

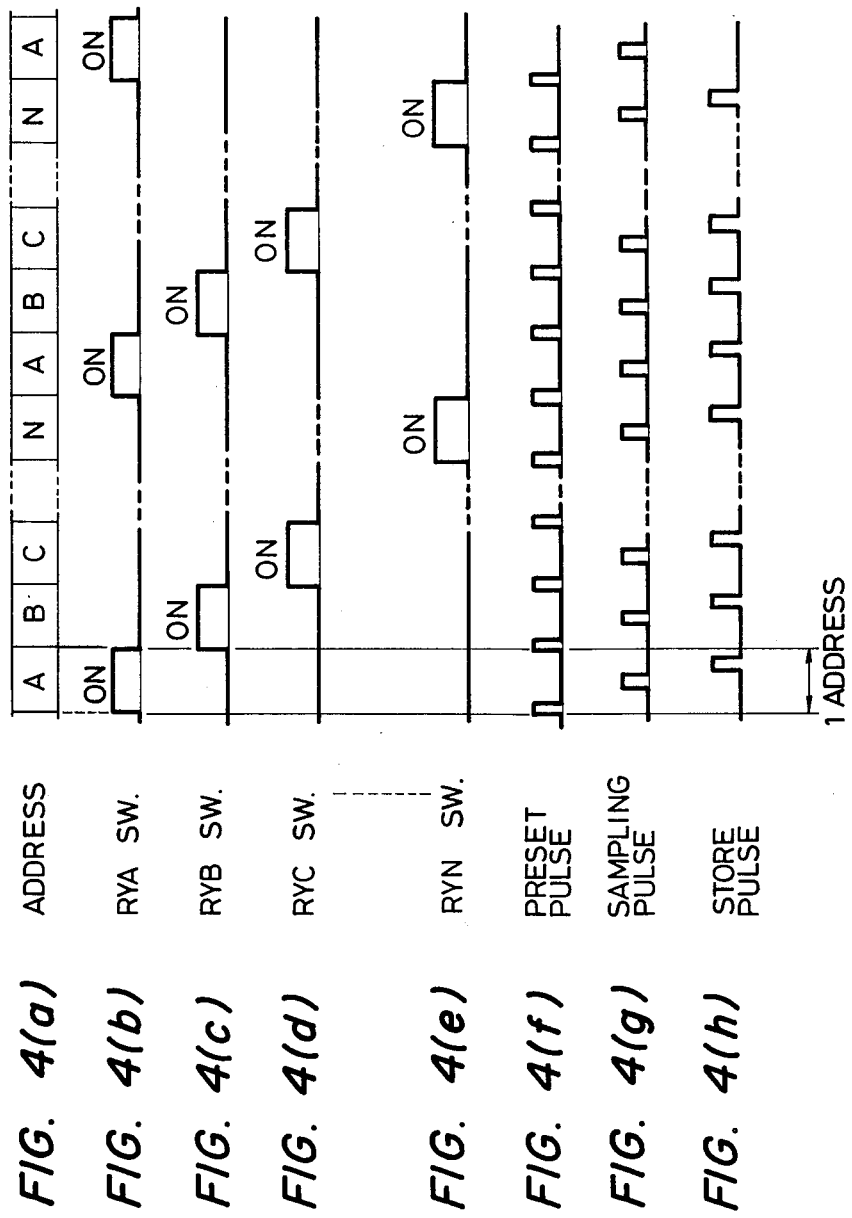

PROTECTIVE RELAY

BACKGROUND OF THE INVENTION

The present invention relates to an electric power protective relay and, more particularly, to a static protective relay suitable for monitoring power lines by carrying out various relay functions collectively.

It is the duty of the protective relay that in case of occurrence of a fault, such as a short-circuit or a ground fault somewhere in the power system, the protective relay detects the abnormal state which may have an adverse effect on the system and issues a command to disconnect the faulty portion from the system immediately. This objective may be attained by a single protective relay or by a combination of various protective relays.

Protective relays are roughly classified from the viewpoint of the operating mechanism thereof into two general types, i.e., electromagnetic and static relays, and the protective relay according to the present invention belongs to the latter type. The static relay is typically constituted by an input transforming circuit, a vector composing circuit, a rectangular-wave converting circuit, a determining circuit, and an output section. The operation of the static relay results in the generation or extinction of a control output, depending on detected conditions. For a better understanding of the invention, the constituent parts of the static relay will first be described in brief.

(a) Input transforming circuit

This circuit is typically provided with auxiliary transformers such as a voltage transformer, a current transformer or the like, and serves to transform the levels of the input A.C. voltage and current into levels falling within ranges suitable for the determining circuit, to shift the phases of the input data, to optimise the transient characteristics and frequency characteristics of the input data, and to provide isolation between the input circuit section and the determining circuit section.

(b) Vector composing circuit

Necessary vector values are derived from the input voltage and current data, in order to provide the characteristics of a range relay. The vector composing circuit is principally made up of adding and subtracting circuits for processing A.C. data (vector data).

(c) Rectangular-wave converting circuit

This circuit converts sinusoidal waveforms into rectangular ones. Most relays which operate on the basis of the principle of phase detection carry out the sinusoidal-to-rectangular conversion.

(d) Determining circuit

This circuit is made up of various basic electronic circuits, and performs various arithmetic operations and determinations for identifying system failures and abnormalities.

One example of such a static protective relay is disclosed in Japanese Patent Publication No. 13236/1962. In order to provide a relay function with desired characteristics by determining the phase relationship between two AC voltages, the protective relay as disclosed comprises a gate circuit which achieves on/off operations in accordance with the phase relationship between the two voltages, an oscillator which provides a reference frequency for the gate circuit, and a counter which counts the oscillator output as it passes through the gate circuit, whereby the relay operates when the count in the counter exceeds a predetermined value.

Accordingly, a static relay is generally divided into an AC circuit section which handles AC waveforms (vector data) and a DC operating section which handles DC waveforms. In the case where various relays are combined to form a multi-function relay, there can be considered two system architectures, one being a so-called centralized system which has a common AC circuit section for the respective component relays and individual DC circuits provided separately for the respective component relays, and the other being a so-called unit system in which an AC circuit section and a DC circuit are provided for each relay. Both of these systems disadvantageously need many kinds of lead wires and a large space when building up a protective relay installation.

In order to solve such problems, there has been developed digital protective relays which utilize microcomputers. In such a system, the AC circuit section is unified and the sinusoidal waveform is converted into digital data cyclically at a high speed so that a single microcomputer processes the digital data to carry out a number of protective relay functions. The principle of this type of system is that the AC input is digitalized and the data is processed for determining the operation of each relay in a high-speed time sharing fashion, and the operation is repeated at high speed in order to carry out the determination of the operation for numbers of protective relay functions. However, this system involves complicated and time-consuming processes due to the A/D conversion and also requires a high manufacturing cost.

BRIEF DESCRIPTION OF THE INVENTION

The present invention proposes to solve the foregoing prior art deficiencies. Accordingly, it is an object of this invention to provide a protective relay which does not require A/D conversion of data, but operates on the basis of relay operation determination in the analog mode and also utilizes the advantages of the digital mode.

According to an aspect of the present invention, there is provided a protective relay wherein input AC information is transformed into necessary AC levels depending on the protective ranges, and rectangular waveforms obtained from half waveforms of the AC levels are logically processed to produce a time width, whereby determination of the protective operation is made in accordance with the time width, characterized in that in order to carry out various relay functions, a plurality of AC input data is received in a time-division mode, the time-divided AC input data is converted into pulse trains in accordance with the relay functions, and a determination of the protective operation is made on the basis of the pulse trains.

BRIEF DESCRIPTION OF THE DRAWINGS

Preferred embodiments of the present invention will now be described with reference to the accompanying drawings, in which:

FIG. 2 is a set of waveform charts for explaining the sampling of input AC data in the embodiment shown in FIG. 1;

FIG. 3 is a set of waveform charts for explaining the operation of the embodiment shown in FIG. 1;

FIG. 4 is a timing chart for explaining the practical timings in operating the embodiment shown in FIG. 1;

DETAIL DESCRIPTION OF THE PREFERRED EMBODIMENT

Figure 1:
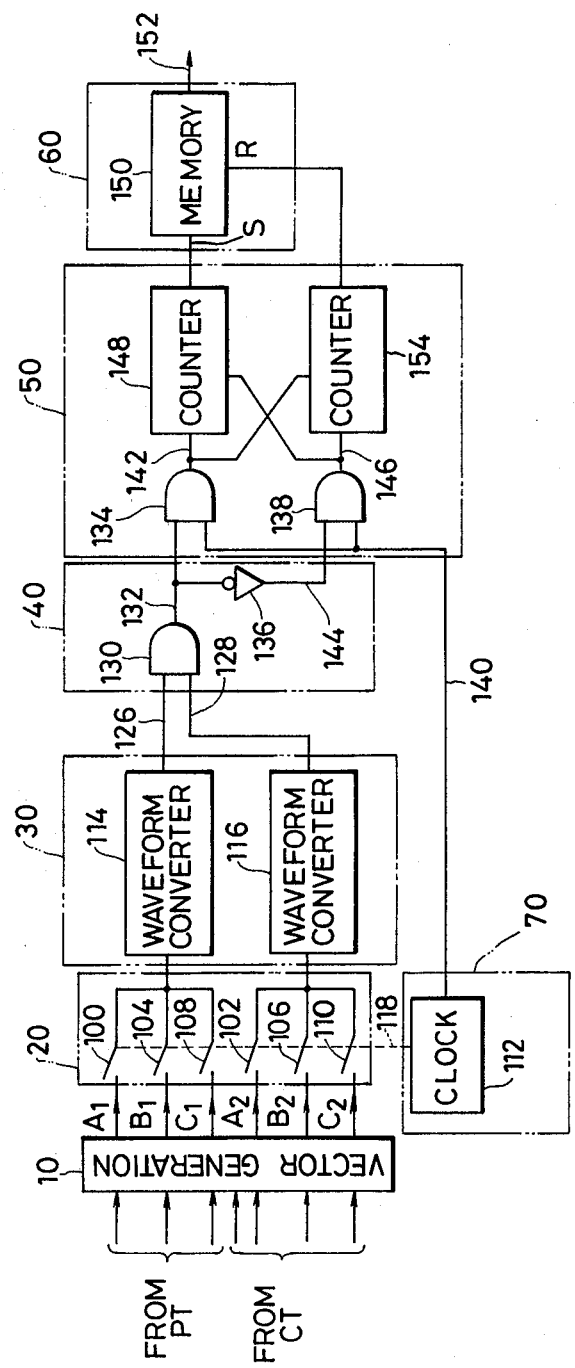
FIG. 1 is a schematic diagram for explaining the principle of an embodiment of the present invention.

FIG. 1 shows an embodiment of the present invention schematically and in principle. For the purpose of simplicity, this embodiment is assumed to provide a determination of the operation for three relay functions, A, B and C, in a time-divided multiplex mode. The protective relay shown in FIG. 1 is constituted by a vector generating section 10, a switching section 20, a level discriminating section 30, a logic section 40, an operation determining section 50, an output section 60, and a control section 70. Although three sets of the operation determining sections 50 and output sections 60 are required corresponding to the three relay functions A, B and C, only one set of these sections for relay function A are illustrated in FIG. 1 for the sake of simplicity of the figure.

The vector generating section 10 receives voltage information, e.g. 3-phase voltages Va, Vb and Vc, from voltage transformers (PT) provided on the power line to be protected, and current information, e.g. 3-phase currents Ia, Ib, Ic and zero-phase current Io, from current transformers (CT) provided on the same power line. The vector generating section 10 provides vectors, e.g. vectors (A1, A2), (B1, B2) and (C1, C2) in this embodiment necessary for the operation of the relay functions A, B and C, based on the input information. Vector generation itself is well known in the art, and therefore, detailed description thereof will be omitted.

The switching section 20 includes three pairs of switches (100, 102), (104, 106) and (108, 110) for time-dividing the vectors received from the vector generating section 10. In the time-dividing operation, the input switch pair 100 and 102 for vectors A1 and A2 are simultaneously turned on during one clock period in response to the output of a clock generator 112 in the control section 70. During the next clock period, the input switch pair 104 and 106 for vectors B1 and B2 are simultaneously turned on, and then the input switch pair 108 and 110 for vectors C1 and C2 are turned on during the subsequent clock period. This operation takes place cyclically in response to the successive clock signals received from the clock generator 112.

The output signals from the switching section 20 have waveforms as shown in FIG. 2. The switching section 20 produces chopped signals A and a from the vectors A1 and A2, respectively, during the first clock period; produces signals B and b from vectors B1 and B2, respectively, during the second clock period; produces signals C and c from vectors C1 and C2, respectively, during the third clock period; produces signals A' and a' from vectors A1 and A2 during the fourth clock period; produces signals B' and b' from vectors B1 and B2 during the fifth clock period; produces signals C' and c' from vectors C1 and C2 during the sixth clock period, and so on. In the same way, information pairs, such as signals (A", a"), (B", b"), (C", c"), (A''', a'''), (B''', b'''), (C''', c'''), and so on, are supplied to a pair of rectangular-wave converters 114 and 116 which constitute the level discriminating section 30. For example, the level discriminating section 30 processes the input signals for the relay function A for one count while the switching section is sampling the vectors A1 and A2. The processing for the relay function A will be described illustratively in connection with FIG. 3.

In FIG. 3, (a) shows a train of clock pulses 118 generated by the clock generator 112. For the sake of simplicity of the drawing, the train of clock pulses is illustrated with a frequency with which only one switch pair, e.g. the switch pair 100 and 102, are driven, whereas, in actual practice the train of clock pulses are required to have a frequency three times that shown in (a) of FIG. 3 so that the switch pairs (100, 102), (104, 106) and (108, 110) are sequencially and periodically actuated as already described. Thus, the switch pair 100 and 102 is closed to introduce vector information to the level discriminator section 30 when a clock pulse exists (at a logical high level), and this switch pair is opened when no clock pulse is present (at a logical low level). Consequently, the input AC waveforms A1 and A2 are transformed into pulses representing the respective instantaneous values thereof as shown in (b) and (d) of FIG. 3, and these pulse data signals 124 and 125 are supplied to the pair of rectangular wave converters 114 and 116 in the level discriminating section 30. The pulse data shown in (b) and (d) in FIG. 3 corresponds to the time-divided data A, A', A", A''', - - -; and a, a', a", a''', - - -, respectively, in FIG. 2.

The rectangular converters 114 and 116 respond to the input pulses whose amplitudes exceed respective preset slice levels 120 and 122, to provide rectangular pulses 126 and 128 each having a given amplitude as shown in (c) and (e) of FIG. 3, respectively. These pulses 126 and 128 are supplied to the respective inputs of an AND gate 130 in the logic section 40 as shown in FIG. 1. Since the input pulses 126 and 128 are in-phase with each other, the AND gate 130 produces a pulse train 132 ((f) of FIG. 3) which is in-phase with the pulses 126 and 128, and therefore in-phase with the clock pulses 118.

Each of the slice levels of the rectangular converters 114 and 116 may be determined depending on the selected relay functions, and these levels may be set to a certain value slightly larger than zero when the relay function needs to compare the phases of two input AC data signals. Although the slice levels 120 and 122 may be set to zero in theory for comparing the phases of two input AC data signals, they are to be set under preferred circumstances to have a small value above zero because, otherwise, it would be difficult to distinguish whether input information exists with an instantaneous zero value, or input information does not exist at all, resulting in possible malfunction of the operation of the relay system. It will be understood that by setting the slice levels 120 and 122 to have a small value above zero, the AND gate 130 produces output pulses 132 only during the period when both the input AC waveforms A1 and A2 have positive values.

The train of output pulses 132 from the AND gate 130 are fed to one input of an AND gate 134 in the operation determining section 50 ((f) of FIG. 3) and, at the same time, these pulses are fed through an inverter 136 in the logic section 40 to one input of an AND gate 138 in the operation determining section 50 ((g) of FIG. 3). The other input of each of the AND gates 134 and 138 is supplied with sampling pulses 140 ((h) of FIG. 3) produced from the clock generator 112 substantially in synchronism with the respective central positions of the clock pulses 118 supplied to the switches 100 and 102.

The generation of the sampling pulses 140 is started when the generation of the clock pulses 118 is started. The output pulses 132 from the AND gate 30 and the sampling pulses 140 are ANDed by the AND gate 134, so that the sampling pulses 140 are enabled to pass through the AND gate 134 as the output pulses 142 ((i) of FIG. 3) while the pulse train 132 exists. The inverter 136 produces output pulses 144 which are the negative version of the pulse train 132, as shown in (g) of FIG. 3. The AND gate 138 achieves a logical AND between the output 144 of the inverter 136 and the sampling pulse train 140 so as to produce a train of pulses 146 as shown in (j) of FIG. 3.

The output pulses 142 from the AND gate 134 are fed to a counter 148 in the operation determining section 50, and the number of received pulses is counted in the counter 148. It will be understood that the total count reached by the counter 148 during each clock period represents a measure of the phase difference between the input AC waveforms A1 and A2. When the contents of the counter 148 reaches a predetermined value, it is recognized that a fault or an abnormal state has occurred and a memory 150 in the output section 60 is supplied with a set signal S from the counter 148 so as to produce an operation signal 152 for the relay function A.

The output pulse train 146 from the AND gate 138 is fed to a second counter 154 which counts the number of pulses of the pulse train 146 and which issues a reset signal R to the memory 150 when the count reaches a predetermined value. The counters 148 and 154 are cleared by the pulse train 146 and 142, respectively.

It has been described illustratively in connection with FIGS. 1 and 2 how the multi-function protective relay receives a pair of AC input signals A1 and A2 in a time-division manner and carries out the relay function A. Similarly, the relay function B is carried out by turning on the switch pair 104 and 106 in response to the 2nd, 5th, 8th, . . . , and (3n−1)th clock pulses in the clock pulse train 118 from the clock generator 112, and the relay function C is carried out by turning-on the switch pair 108 and 110 in response to the 3rd, 6th, 9th, . . . , and 3n−th clock pulses in the clock pulse train 118 (n being a natural number). The determining operations for the relay functions B and C are identical to that for the relay function A as described above.

The principle of the present invention has been described illustratively. In actual practice, however, the operation determining section 50 and the output section 60 are required to be provided individually for each of the relay functions, and these sections have to be operated sequentially in synchronism with the time-divided switching operation for the input AC signals. However, provision of the operation determining section 50 and the output section 60 for each relay function makes the overall system expensive and also necessitates provision of a large installation space. It is therefore desirable to provide only a single pair of counters for multiplex use. In order to attain this objective, special devices as described hereunder are required.

The principle of the multiplexing method of the present invention will be described with reference to FIG. 4, where an assumption is made that the protective relay performs n relay functions, A, B, C, . . . , N, on a time-divided multiplex basis. As described earlier in connection with FIG. 3 for the embodiment of FIG. 1, only ⅓ of the actual clock pulses have been shown for simplicity so that the input AC waveforms are sampled by each clock pulse. However, in actual practice the clock pulse has a frequency three times as high as that frequency, with the first clock pulse operating on the switch pair 100 and 102 for relay function A, the second clock pulse operating on the switch pair 104 and 106 for relay function B, the third clock pulse operating on the switch pair 108 and 110 for relay function C, the fourth clock pulse operating on the switch pair 100 and 102 again, and so on. In this case, therefore, three clock periods are regarded as a period of one count for each of the three relay functions. Thus, for carrying out n relay functions, n clock periods constitute a period of one count for each of the n relay functions.

As shown in (a) of FIG. 4, addresses each having an addressing period which equals the period of one count are issued for each relay function. The addresses A, B, C, . . . , and N correspond to the respective relay functions A, B, C, . . . , and N, and they are generated cyclically, such as A, B, C, . . . , N, A, B, C, . . . , N, and so on.

The following operations take place during each addressing period:

(1) A switch pair corresponding to an address is turned on so as to fetch input AC data for determining the relay operation corresponding to that address;

(2) The count for the previous addressing period for the same address, which has been stored in a memory, is read out and preset in counters similar to those counters 148 and 154 shown in FIG. 1;

(3) A sampling pulse as shown by 140 in (h) of FIG. 3 is generated, and the preset value in one of the counters is incremented by one; and (4) The count represented by the contents of the counters are once again stored in the memory at the same address.

These four steps of operation are shown in (a) to (h) of FIG. 4. For example, during the addressing period A for the relay function A (RYA), the switch pair for the RYA operation is turned on and the following pulses are then generated sequentially:

A Preset pulse ((f) of FIG. 4) . . . Operation of step 2

(b) Sampling pulse ((g) of FIG. 4) . . . Operation of step 3

(c) Storing pulse ((h) of FIG. 4) . . . Operation of step 4.

This operation is repeated for each address for the operation determination for each relay function. Thus, the same counter pair is used on a multiplex basis by making access to the memory for each address cyclically.

The address switching frequency relates significantly to the accuracy of determining the relay operation. The higher the address switching frequency, the higher will be the resolution of determination. Since determination for one relay operation is made every n address periods, if determination for each relay operation needs an accuracy of 1° in electrical angle, the address switching frequency F must satisfy:

$$F \geq f \times 360° \times n$$

where f is the fundamental frequency of the input AC data.

Figure 5:
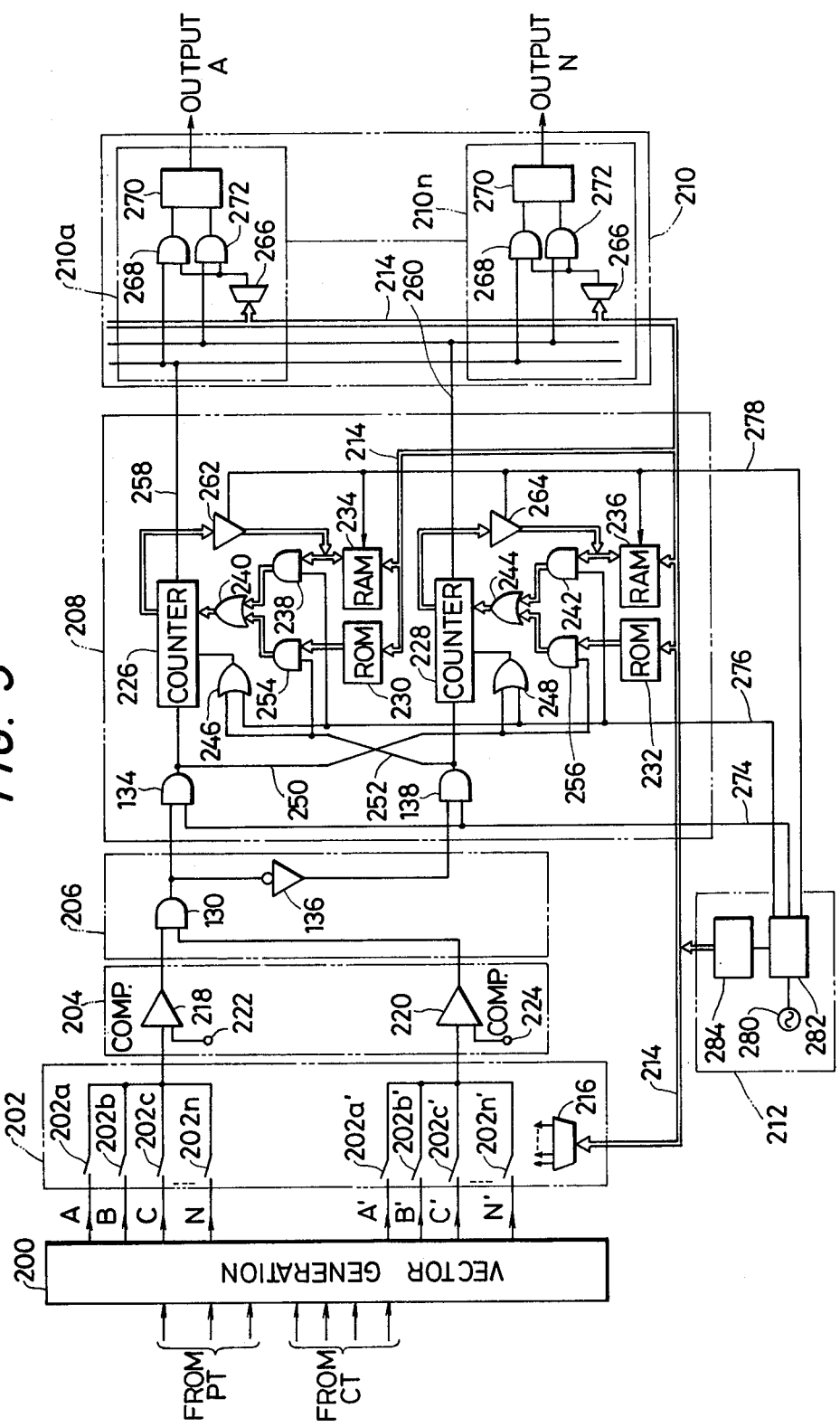
FIG. 5 is a particular circuit diagram corresponding to the embodiment shown in FIG. 1.

FIG. 5 shows a preferred embodiment of the time-division multiplex protective relay according to the present invention. The protective relay includes a vector generating section 200, a switching section 202, a level discriminating section 204, a logic section 206, an operation determining section 208, an output section 210, and a control section 212, as in the case of the arrangement shown in FIG. 1.

The vector generating section 200 receives the three-phase voltages Va, Vb and Vc from voltage transformers (PT) and the three-phase currents Ia, Ib, Ic and the zero-phase current Io from current transformers (CT), and generates vectors, for example, (A, A'), (B, B'), (C, C'), ..., (N, N') necessary for the respective relay functions A to N. The vector generation is known well in the art, and therefore, the explanation thereof will be omitted.

A decoder 216 provided in the switching section 202 decodes the address which is sent from the control section 212 through an address bus 214 and by which one of the switch pairs 202a and 202a'; 202b and 202b'; 202c and 202c'; ... ; 202n and 202n' are selectively addressed in accordance with the decoded address so as to be turned on.

The level discriminating section 204 includes a pair of comparators 218 and 220 receiving signals representing respective slice levels at inputs 222 and 224 which are compared with instantaneous values of vectors entered through the selected switch pair, similarly to the rectangular-wave converters 114 and 116 as shown in FIG. 1. Each of the comparators 218 and 220 produces a low level pulse signal when the input vector level is smaller than the input slice level, and produces a high level pulse signal when the input vector level exceeds the input slice level.

The logic section 206 includes an AND gate 130 which achieves a logical AND between the outputs of the comparators 218 and 220, and an inverter 136 which inverts the output of the AND gate 130, as in the case of FIG. 1. The operation of the AND gate 130 and inverter 136 is exactly the same as in the case of FIG. 1.

The operation determining section 208 includes a pair of AND gates 134 and 138, a pair of parallel-in/parallel-out counters 226 and 228, a pair of read-only memories (ROMs) 230 and 232 which store the initial values for these counters, and a pair of random access memories (RAMs) 234 and 236 which are used to store the progressive counts of the counters. The operation determining section 208 operates as follows in one addressing period shown in FIG. 4 in response to the preset pulse ((f) of FIG. 4 provided on line 276 from clock pulse generator 282), the sampling pulse ((g) of FIG. 4 provided on line 274) and the storing pulse ((h) of FIG. 4 provided on line 278).

(1) When the preset pulse is generated on line 276, the RAM 234 (RAM 236) is in the read mode due to the absence of the storing pulse, and, when an address is received via bus 214, the count which has been stored at this address in the RAM during the previous operation is read out through the AND gate 238 and the OR gate 240 (the AND gate 242 and the OR gate 244) and preset into the counter 226 (counter 228). This preset operation is timed by applying outputs from the OR gates 246 and 248 to the counters 226 and 228, respectively, as a load signal when the preset pulse is generated.

(2) When the sampling pulse is then generated on line 274, the AND gates 134 and 138 are enabled and one of these gates produces a signal similar to 142 (146) in FIG. 3 to increment the contents of the counter 226 (counter 228) by one. In this case, only one of the AND gate 134 and 138 can produce an output signal during one address period as seen from (i) and (j) of FIG. 3. For purposes of explanation, let it be assumed that it is AND gate 138 which produces an output to increment the contents of counter 228 at this time. Thus, the counter 226 will receive no output from the AND gate 134 and will be set again to the initial value predetermined for each address as stored in the ROM 230 through the corresponding AND gate 254 and OR gate 240 in response to the output signal 252 from AND gate 138. This operation is timed by the existing output signal 252 which is fed as a load signal to the counter 226 via the OR gate 246. At the same time, the counter 228 is incremented by the output from AND gate 138, and when the content of counter 228 reaches the maximum count or full-bits state as a result of this incrementing operation (the counters 226 and 228 have the same capacity), it produces a carry signal 260 for the output section 210.

On the other hand, if it is the AND gate 134 which produces an output to increment the contents of counter 226, the counter 228 will be set to the initial value stored in ROM 232 via AND gate 256 and OR gate 244. This operation is timed by the output signal 250 from the AND gate 134 which is fed as a load signal to the counter 228 via OR gate 248. At the same time, the counter 226 is incremented by the output of the AND gate 134, and when the contents of counter 226 reaches the maximum count or full bits state as a result of this incrementing operation, it produces a carry signal 258 for the output section 210.

(3) Subsequently, when the storing pulse is generated on line 278, the RAMs 234 and 236 are brought into the write mode and three-state buffers 262 and 264 are actuated to cause the RAMs 234 and 236 to store the contents of the counters 226 and 228 into the respective addresses specified through the bus 214.

Thus, during a given address period, one of the counters 226,228 will be incremented and the other will be reset to the initial value stored in the corresponding ROM, depending on which of the AND gates 134,138 produces an output. As seen from (i) and (j) of FIG. 3, during that part of the AC cycle when the sampled waveforms are both positive, the counter 226 will be successively incremented from the initial value, while the counter 228 will be successively reset to the initial value. During the remaining part of the AC cycle, the counter 228 will be successively incremented from the initial value, and the counter 226 will be successively reset to the initial value.

In the output section 210, a decoder 266 decodes the address on the bus 214 to select one of the output circuits 210a–210n for respective relay functions A to N. In the thus selected output circuit (e.g. 210a) when the signal on the line 258 goes high, the output of the decoder 266 is allowed to pass through an AND gate 268 to set a memory element 270 to render the output of the relay function (e.g. output A) selected by the decoder 266 high. On the contrary, when the signal on the line 260 goes high, the output of the decoder 266 is allowed to pass through an AND gate 272 to reset the memory 270 to render the output (e.g. output A) low. This operation is timed by the counter output 258 or 260 caused by the sampling pulse 274.

In order to carry out the foregoing operations, the control section 212 includes an oscillator 280 for generating the preset pulse 276, the sampling pulse 274 and the storing pulse 278, a clock pulse generator 282, and an address counter 284 which generates the address in synchronism with the clock pulse. The bus 214 is also driven by the oscillator 280.

By the arrangement as described above, the basic operation of the present invention shown in FIG. 1 can be carried out on a time-divided multiplex basis.

The foregoing embodiment has been described as a direct phase-comparison circuit. The arrangement of FIG. 5 can also function to estimate the magnitude of a single input value. For example, for a certain address, one of the two inputs to the level discriminator, e.g. the input to the comparator 218, is supplied with AC data while another input, i.e. the input to the comparator 220, is supplied with a DC level higher than its slice level, so that the result of logical ANDing operation for the outputs of the comparators 218 and 220 indicates the duration in which the input AC data exceeds the set level. This duration is measured by the operation determining section 208, and the output section 210 produces an output when the duration is longer than a predetermined value.

In the arrangement of FIG. 5, the counters 226 and 228 serve as adders, and they may be replaced with other arithmetic circuits capable of performing addition. In the case where the output of the arrangement of FIG. 5 is connected to an interface of an external computer, the output section 210 may be omitted, and the counter output lines 258 and 260 and the address bus 214 may be connected directly to the computer interface. In addition, the operations of the logic section 206, operation determining section 208, output section 210, and control section 212 can be carried out by logical computation through the software in a microcomputer.

Figure 6:
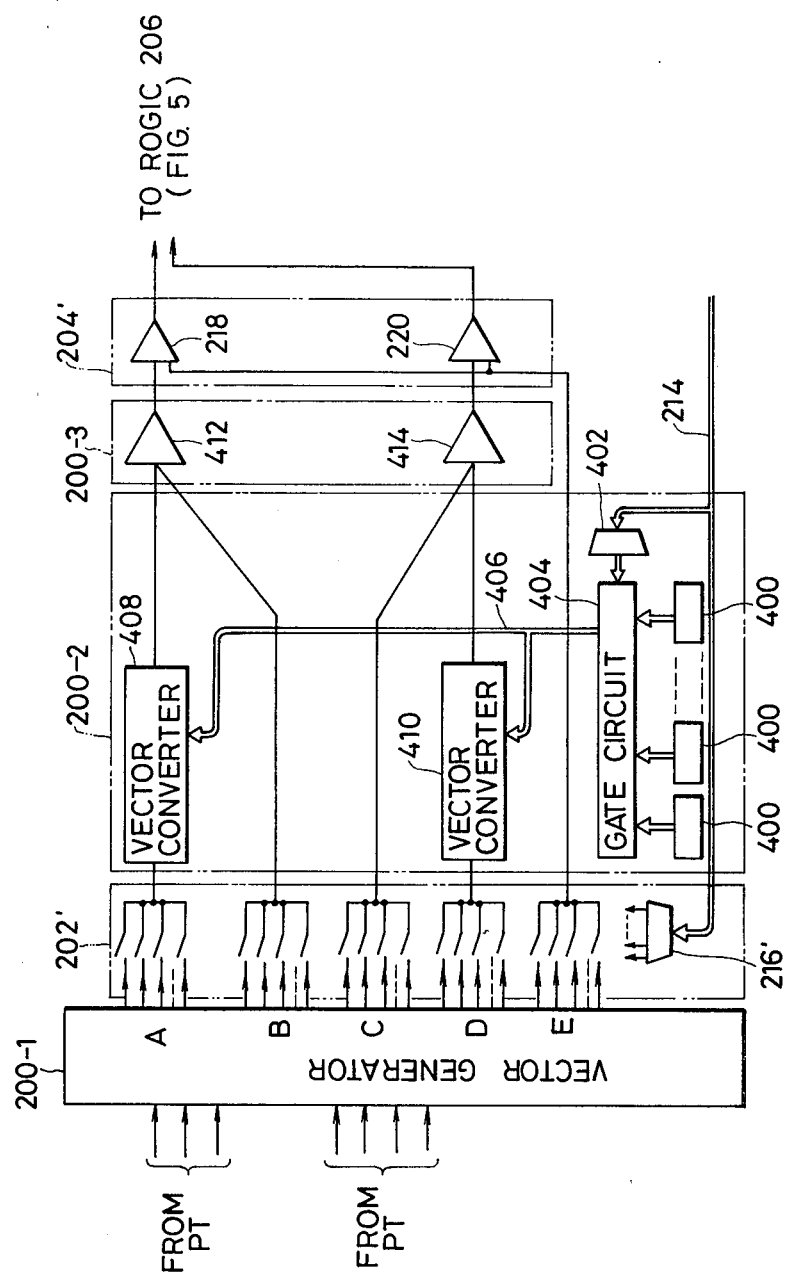
FIG. 6 is a circuit diagram showing in part another embodiment derived from the embodiment shown in FIG. 5.

FIG. 6 shows in part a modified version of the embodiment shown in FIG. 5.

As described previously, in the arrangement of FIG. 5 the vector generating section 200 is followed by the switching section 202 which is in turn connected to the level discriminating section 204. The sections following the switching section 202 are used in common for determining various relay functions. Obviously, the greater the range of the commonly used portions, the higher will be the efficiency of the installation. The embodiment of FIG. 6 is based on such a consideration, and is arranged in such a way that the vector generating section 200 is disintegrated on the basis that the functions of the conventional relay and the switching section are provided in a more forward stage. The functions of the vector generating section 200 can be divided on the basis of the functions of a conventional relay into the following four sections:

(1) Input auxiliary transformer section (auxiliary PT and CT);

(2) Phase shifting section for generating necessary AC vectors;

(3) Setting section for converting the magnitude of AC data into a predetermined value to determine the operating range of the relay; and (4) Vector calculating section for processing the outputs of the above sections mentioned in (1)-(3) to generate AC vectors necessary for making the final determination of the operation.

Figure 7A:
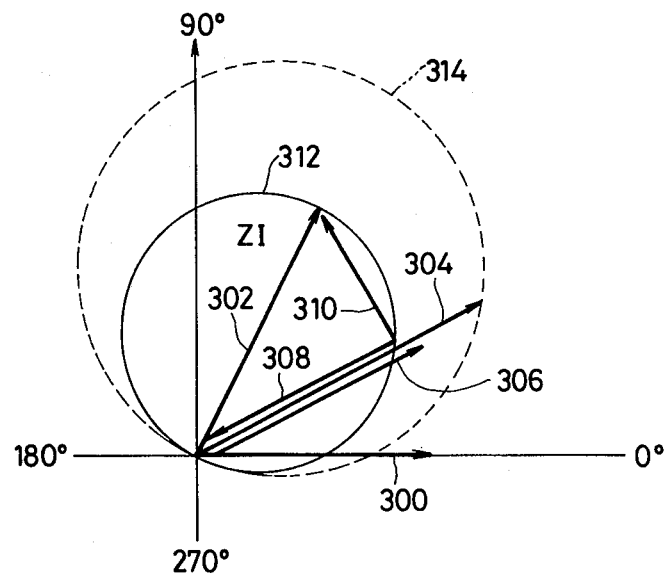
FIGS. 7A and 7B are diagrams showing the relationship between vector generation and operational determination.
Figure 7B:
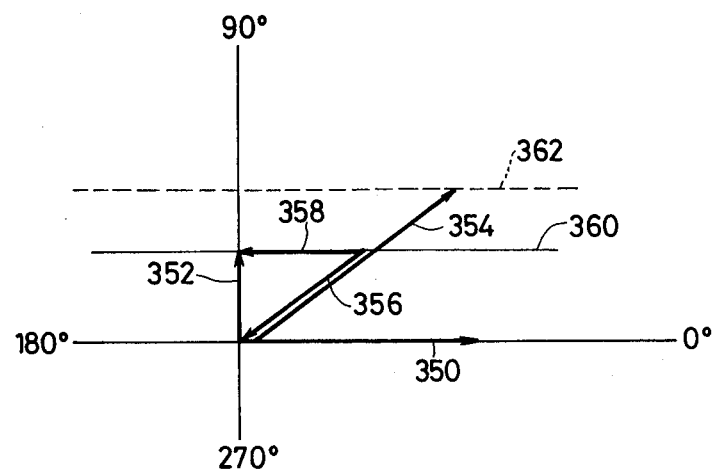

The processes performed by the above four sections are known well in the art, and two examples are shown in FIGS. 7A and 7B. FIG. 7A shows the mho characteristics and FIG. 7B shows the reactance characteristics of a range relay. In FIG. 7A, a current input 300 to the relay is regarded as a basis of conversion and converted into a ZI vector 302 having a predetermined magnitude and phase angle. A voltage input 304 to the relay is also connected into an in-phase vector 306 and a vector 308 having the opposite phase. The magnitude of the vector 308 is proportional to the magnitude of the vector 304 in accordance with the setting which determines the operation of the relay. In addition, a range vector 310 is produced by adding the vector 302 to the vector 308. With the operating range as seen inside the relay assumed to be a circle 312, the operating range as seen from the input of the relay becomes a circle 314, resulting in a criterion of determination to be: "The phase difference between vectors 310 and 306 should be 90° or less".

The vectors are generated in accordance with the following procedures:

(i) The AC inputs 300 and 304 are fetched in accordance with the foregoing items (1) and (2) to generate the vectors 302 and 306;

(ii) Vector 308 is produced from the vector 304 in accordance with the item (3); and (iii) Vector 310 is produced by adding the vctors 302 and 308 in accordance with the item (4).

Similarly, in FIG. 7B, a vector 352 is generated on the basis of a current input 350, a vector 356 is produced on the basis of a voltage input 354, and a range vector 358 is produced by adding the vectors 352 and 356. The criterion for determining the operation is the phase difference of 90° or less betwen the vectors 358 and 352 as in the case of the above-mentioned mho characteristics. The operating range seen from the internal vector is shown by 360, and the operating range seen from the relay input is shown by 362. These vectors are generated in accordance with the foregoing items (1)-(4), similarly to the case of mho characteristics, and general relays such as the range relay are covered by this method.

In FIG. 6, the vector generating section 200 shown in FIG. 5 is divided into an auxiliary transformer section (not shown), a vector generating section 200-1, a setting section 200-2 and a vector calculating section 200-3. The output vectors from 200-1 are selected in the switching section 202' by decoding the address on the address bus 214 by means of the decoder 216', then the selected vectors are supplied to the section 200-2. The principle of operation and the timing of operation are generally identical to the case of FIG. 5.

The section 200-1 receives the AC input from the auxiliary transformers (not shown) and produces vector groups A, B, C, D, and so on. In the example of FIG. 7A, these vector groups are as follows.

A: Vector 308, B: Vector 302 and C: Vector 306

Vector group D is not used in this example. However, for obtaining the offset mho characteristics, the vector group D will be a voltage vector group for setting offset values.

In the switching section 202', the decoder 216' decodes the address on the bus 214, and the addressed switch pair is turned on. The principle of this operation is identical to that of the section 202 in FIG. 5.

In the setting section 200-2, the decoder 402 decodes the address on the bus 214, and one of the setting circuits 400 made up of digital switching means or the like for the respective relay functions is selected by the gate circuit 404 based on the decoded address, so that the addressed setup value in the selected setting circuit 400 is sent over the bus 406. The setup value on the bus 406 drives the setup value converters 408 and 410 so that the AC vector is converted to have a specified magnitude. Although converters 408 and 410 function in similar manner to the conventional setting taps, the vectors need to be switched at a high speed according to the given address. Therefore, the converters 408 and 410 are preferably provided as semiconductor devices, and they can be designed easily using voltage dividers formed by resistors and semiconductor analog switches which select the outputs of the voltage dividers.

The vector calculating section 200-3 includes vector adders 412 and 414, each made up of an operational amplifier and associated components. The outputs of the vector calculating section 200-3 are applied to the level discriminating section 204' which is similar to the section 204 shown in FIG. 5. The sections following the level discriminating section 204' are exactly identical to those of the embodiment shown in FIG. 5 and illustration and description of these sections will be omitted for that reason.

The switching section 202' may be additionally provided with a switch group E so that the slice levels for the comparators 218, 220 in the level discriminating section 204' can be selected by the address, whereby such a relay function as to determine the magnitude of a single AC data, namely to judge the excessive current and deficient voltage, can be incorporated. For example, the judgement of excessive current can be carried out in such a way that the duration of time during which the current exceeds the slice level is measured in each half cycle of the input AC data by the count system according to the present invention and the determination of such operation is made when the count reaches a predetermined value.

The arrangement of FIG. 6 includes more circuits following the switching section as compared with the arrangement of FIG. 5. This allows more sections to be used in common in determining the operations of the relay functions, and thereby, a more effective relay system can be provided.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A protective relay for performing a plurality of relay functions in response to received AC data, comprising:

vector generating means responsive to received AC data for generating a plurality of vectors indicative of parameters of said AC data relating to the relay operations of said plurality of relay functions;

switching means responsive to said vector generating means for sequentially sampling said plurality of vectors for each of said relay functions in pairs in a specified order of said relay functions to produce first and second sampled outputs;

level discriminating means connected to said switching means for comparing said first and second sampled outputs with respective slice levels selectively assigned to each relay function so as to produce first and second pulses having a given amplitude each time the respective first and second sample outputs exceeds the respective slice level;

logic means for logically processing said first and second pulses produced by said level discriminating means to produce a logical output indicative of a characteristic of said AC data for each relay function and an inverted logical output;

operation determining means responsive to said logical output and said inverted output for generating a control output representing a time duration relating to the relay operations of said plurality of relay functions sequentially in said specified order; and output means including a plurality of output circuits respectively corresponding to said relay functions and selected in synchronism with said switching means for producing relay operation signals for related relay functions in response to the control output of said operation determining means.

2. A protective relay as defined in claim 1, wherein said vector generating means comprises a vector generator which generates a plurality of vectors in response to applied AC data and applies said vectors to said switching means and a setting/calculating section which is connected between said switching means and said level discriminating means for producing a pair of vectors as said first and second sampled outputs representing the relay operations of said plurality of relay functions.

3. A protective relay as defined in claims 1 or 2, further including control means connected to said switching means, said operation determining means and said output means for synchronizing the timing of said sampling of vectors, said control output generation and said output circuit selection.

4. A protective relay as defined in claim 3, wherein said control means includes means for generating in a repetitive sequence a plurality of addresses which indicate said specified order of said relay functions, and means for applying said addresses to said switching means for controlling the operation thereof.

5. A protective relay as defined in claim 4, wherein addresses are generated by said control means during successive address periods, said control means further including means for generating a preset pulse, a sampling pulse and a storing pulse in order during each address period.

6. A protective relay as defined in claim 5, wherein said operation determining means includes first and second counters, first and second read only memories, first and second erasable memories, and logical control means responsive to said preset pulses, said sampling pulses, said storing pulses and said addresses for controlling said first and second counters, said first and second read only memories and said first and second erasable memories such that in one address period the values which have been stored in said first and second erasable memories during the previous period of the same address are read out to be preset to said first and second counters, respectively, in response to a preset pulse generated in said one address period, the count value in said first counter is incremented by one when said logical output of said logic means is produced and the count value in said second counter is incremented by one when said inverted logical output of said logic means is produced, in response to a sampling pulse generated subsequently to said preset pulse, and the contents of said first and second counters are stored in said first and second erasable memories, respectively, in response to a storing pulse generated subsequently to said sampling pulse.

7. A protective relay as defined in claim 6, wherein predetermined first and second initial count values relating to the relay operations of said relay functions are stored in said first and second read only memories, and wherein said logical control means of said operation determining means includes means responsive to said logical output of said logic means for transferring the contents of said second read only memory to said second counter and responsive to said inverted logical output of said logic means for transferring the contents of said first read only memory to said first counter.

8. A protective relay as defined in claim 7, wherein the control output of said operation determining means comprises overflow signals from said first and second counters, and wherein said output circuits in said output means are responsive to an overflow signal from said first counter for producing a relay operation signal and are reset in response to an overflow signal from said second counter.

9. A protective relay as defined in claim 8, wherein said output circuits are connected to receive said addresses generated by said control means so that said output circuits are selected to receive the control output of said operation determining means in said specified order of said relay functions.

* * * * *